No. 737,469. PATENTED AUG. 25, 1903.
P. M. PIERSON.
BENCH FOR GREENHOUSES.
APPLICATION FILED FEB. 9, 1903.
NO MODEL.
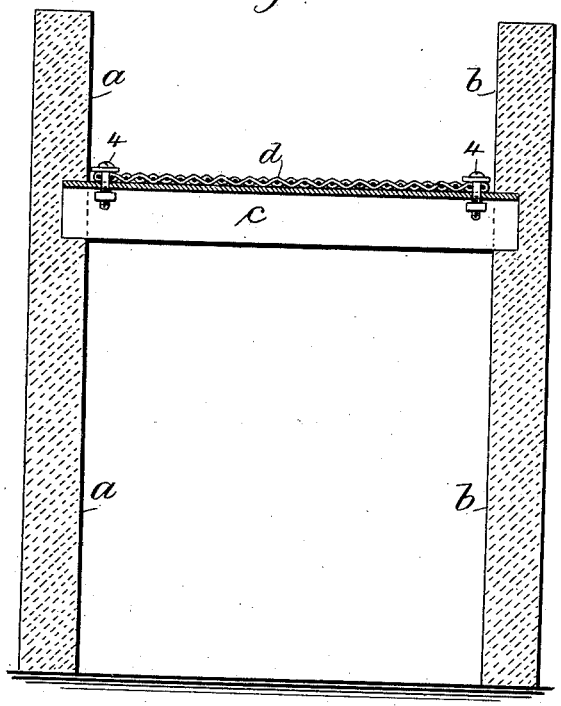
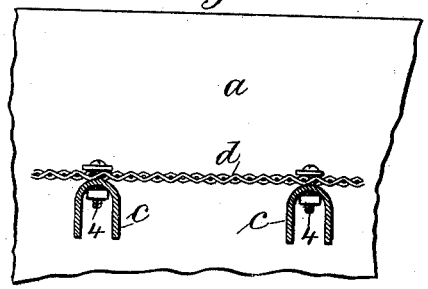
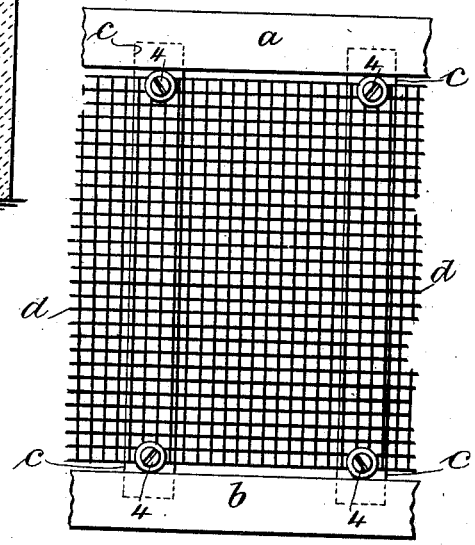
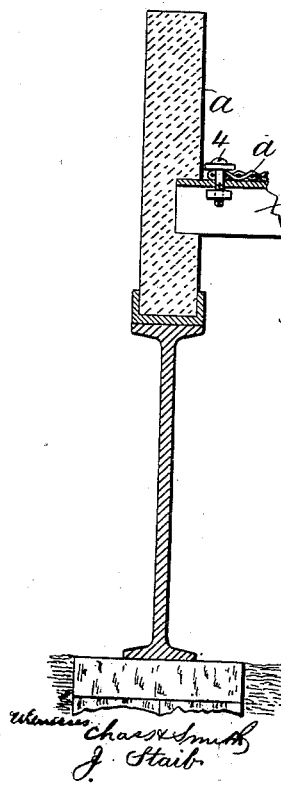
Inventor
Paul M. Pierson.
per Harold Serrell No. 737,469. Patented August 25, 1903.

UNITED STATES PATENT OFFICE.

PAUL M. PIERSON, OF OSSINING, NEW YORK.

BENCH FOR GREENHOUSES.

SPECIFICATION forming part of Letters Patent No. 737,469, dated August 25, 1903.

Application filed February 9, 1903. Serial No. 142,448. (No model.)

*To all whom it may concern:*

Be it known that I, PAUL M. PIERSON, a citizen of the United States, residing at Ossining, in the county of Westchester and State of New York, have invented an Improvement in Benches for Greenhouses and Similar Structures, of which the following is a specification.

Heretofore the benches of greenhouses and similar structures have usually been made with wooden sides supported on uprights and a bottom of wood, the parts of which extended transversely and were secured to the sides, either within the limits of the sides or upon the edges. These benches have been filled with earth for plants growing directly in the earth or for plants growing in pots set into the benches, and usually beneath these benches have been pipes for supplying heat. These wooden structures have heretofore required frequent renewing, because the moisture would rot the boards, especially the bottom boards, and these bottom boards possessed the disadvantage of preventing the rising heat being taken up by the earth in which the plants were growing.

The object of my invention is to provide a bench for greenhouses and other structures not open to these objections and which shall be of a more permanent character.

In carrying out my invention the bench for greenhouses or other structures is preferably made with sides formed of blocks or slabs of concrete or other suitable material advantageously built in a frame and which sides may either extend to the ground or floor of the structure or be built above and upon a base or foundation of suitable material. Between these sides and let into the same are metal cross-bars suitably spaced apart, and between the sides and resting upon and secured to said cross-bars is a layer of woven wire or wire-netting. The earth is placed directly upon this netting and between the sides. With this structure it will be apparent that surplus moisture in the earth readily escapes, that there are no wooden parts in the bottom of the bench to become rotton, and that the heat rising from the heating-pipes can readily enter the soil through the openings in the woven wire or netting.

In the drawings, Figure 1 is a plan of part of a bench, illustrating my invention. Fig. 2 is a cross-section. Fig. 3 is a longitudinal section, and Fig. 4 represents by a cross-section a modification of the structure.

The bench sides *a b* are formed of blocks or slabs of concrete, stone, plaster, wood, or other suitable permanent material. In Fig. 2 I have shown these sides as extending down to the floor or ground of the greenhouse or other structure, while in the modification, Fig. 4, I have shown one side as supported upon a U form of angle-iron and a metal leg, which leg is preferably supported upon a brick pier. In the modified form these sides are built up directly upon the metal structure after the same is put in position, in which case, as also in the principal form, the concrete blocks or slabs are formed either upon the support between temporary board sides or formed in suitable molds, the ends being connected by cement after being put in position. Cross-bars *c* are employed with the ends advantageously let into and secured in any desired manner to the sides *a b*. These cross-bars are preferably bent metal plates and are shown of substantially semicircular form. These cross-bars are placed at intervals along the bench, extending between the sides, and serve as supports for the layer of woven wire or wire-netting *d*. This is received between the sides *a b* and is secured to the cross-bars *c* in any desired manner. I prefer as such securing means the bolts 4, provided with washers which bear upon the upper surface of the woven wire or netting *d*, while the bolts pass down through the meshes of the netting and through openings in the cross-bars and are provided with securing-nuts within the bars, the woven wire or netting being held by these bolts securely in place, preventing the weight of the superimposed earth placed thereon from causing the netting to sag.

In this bench growing plants in pots may be set upon the woven wire or netting; but I prefer to employ this form of bench where the soil is filled in and supported by the woven wire or netting. The soil may be filled into the bench in any desired manner, the same forming no part of my invention. In this structure any superfluous moisture which percolates through the earth falls away directly below the woven wire or netting, and the heat of the hot-water or steam pipes, usually placed beneath the bench, rises through the meshes of the woven wire or netting and is taken up by the soil, there being no intervening obstruction.

I do not herein limit myself to the special character of the sides, the particular form of the cross-bars, or to the use of supporting devices connecting the woven wire to the cross-bars, as the sides may be of wood, and regardless of the materials composing the same said sides may be carried and supported by posts or beams of iron or wood. The woven wire or netting I prefer to be heavily galvanized, as the same is thereby preserved for a long period from rust or corrosion.

I claim as my invention—

1. A bench for greenhouses or other similar structures, comprising sides formed of blocks or slabs of suitable material, cross-bars extending between, passing into and secured to the sides and a layer of material forming a support between the sides upon the cross-bars and forming the bottom to the bench, and means for securing the same to the cross-bars.

2. A bench for greenhouses or similar structures, comprising sides formed of blocks or slabs of suitable material, metal cross-bars entering and secured to the respective sides, a layer of woven wire resting upon the cross-bars and extending between the sides, and means for securing said layer of woven wire directly to each of said cross-bars so as to prevent sagging, said woven wire forming the bottom of the bench.

3. A bench for greenhouses or other similar structures, comprising sides formed of blocks or slabs of suitable material, cross-bars formed of substantially semicircular metal plates extending between the sides with the ends entering the sides and secured thereto, a layer of woven wire extending between the sides and resting upon said cross-bars, and bolts passing down through the meshes of said woven wire and through the said plates to positively secure said layer of woven wire to said cross-bars, the same forming the bottom of the bench.

4. A bench for greenhouses or other similar structures, comprising sides formed of blocks or slabs of suitable material, cross-bars formed of substantially semicircular metal plates with the curved convex side uppermost and extending between the sides with the ends entering the sides and secured thereto, a layer of woven wire extending between the sides and resting upon said cross-bars, and bolts passing down through the meshes of said woven wire and through the said plates, with the threaded stems and nuts below the outer convex surface of the bars to positively secure said layer of woven wire to said cross-bars, the same forming the bottom of the bench.

Signed by me this 17th day of January, 1903.

PAUL M. PIERSON.

Witnesses:
GEO. T. PINCKNEY,
BERTHA M. ALLEN.